US00RE46010E

(19) United States
(12) Reissued Patent
Kaiser

(10) Patent Number: US RE46,010 E
(45) Date of Reissued Patent: May 24, 2016

(54) METHOD FOR PRODUCING PULLING RODS FOR USE IN MANUFACTURING SHEET GLASS

(75) Inventor: David S. Kaiser, Millington, TN (US)

(73) Assignee: Corning Incorporated, Corning, NY (US)

(21) Appl. No.: 12/604,112

(22) Filed: Oct. 22, 2009

Related U.S. Patent Documents

Reissue of:
(64) Patent No.: 7,284,328
Issued: Oct. 23, 2007
Appl. No.: 11/132,547
Filed: May 19, 2005

U.S. Applications:
(62) Division of application No. 10/393,488, filed on Mar. 20, 2003, now Pat. No. 6,896,646.

(60) Provisional application No. 60/366,858, filed on Mar. 22, 2002.

(51) Int. Cl.

| | |
|---|---|
| ***B21K 1/02*** | (2006.01) |
| ***C03B 35/00*** | (2006.01) |
| ***F16C 13/00*** | (2006.01) |
| ***F27D 3/02*** | (2006.01) |
| ***C03B 35/18*** | (2006.01) |

(52) U.S. Cl.
CPC ..... *F27D 3/026* (2013.01); *C03B 35/185* (2013.01)

(58) Field of Classification Search
USPC ..... 492/38, 50, 40, 52, 53, 47; 29/895.21, 29/895.22, 895, 895.213, 895.3; 65/17.1, 65/25.2, 25.4, 370.1, 374.13
See application file for complete search history.

(56) References Cited

U.S. PATENT DOCUMENTS

| | | | | |
|---|---|---|---|---|
| 3,116,053 | A | 12/1963 | Ericsson | 432/236 |
| 3,334,010 | A | 8/1967 | Moore | 162/154 |

(Continued)

FOREIGN PATENT DOCUMENTS

| | | |
|---|---|---|
| DE | 195 04 044 | 9/1995 |
| DE | 195 04 044 A | 9/1995 |

(Continued)

OTHER PUBLICATIONS

Akase, M., "Non Asbestos Disk Roll for Stainless Steel (using T#6710-M Non-Asbestos millboard)," Nichias Technological Review, 1993, vol. 1, No. 278, pp. 10-16.

(Continued)

*Primary Examiner* — Moshe Wilensky
(74) *Attorney, Agent, or Firm* — Thomas R. Beall; Maurice M. Klee; Ryan T. Hardee

(57) ABSTRACT

Pulling rolls (13) for glass ribbons (11) and methods for manufacturing such rolls are provided. The rolls include a shaft (17), a plurality of heat-resistant discs (15) mounted on the shaft in face-to-face contact, and a pair of fittings (25 or 25,31) affixed to the shaft which apply an axial compressive force to the discs. The magnitude of the axial compressive force is adjusted so that the portions (27) of the roll surface (33) which contact the glass ribbon during use have a Shore D hardness at room temperature of between 30 and 55. The rolls achieve a long service life without applying excessive force to the glass ribbon or generating high levels of particulate contamination.

7 Claims, 6 Drawing Sheets

(56) References Cited

U.S. PATENT DOCUMENTS

| | | | | | |
|---|---|---|---|---|---|
| 3,338,696 | A | | 8/1967 | Dockerty | 65/145 |
| 3,682,609 | A | | 8/1972 | Dockerty | 65/83 |
| 3,763,533 | A | * | 10/1973 | Blom et al. | 492/40 |
| 3,853,525 | A | | 12/1974 | Gorman | 65/181 |
| 4,397,673 | A | | 8/1983 | Stevens | 65/374.11 |
| 4,533,581 | A | * | 8/1985 | Asaumi et al. | 428/64.1 |
| 4,872,247 | A | | 10/1989 | Nakamura et al. | 492/40 |
| 5,038,469 | A | * | 8/1991 | Masuda et al. | 29/895.213 |
| 5,205,398 | A | * | 4/1993 | Hart et al. | 198/780 |
| 5,406,706 | A | * | 4/1995 | Nagai | 29/895.33 |
| 5,989,170 | A | | 11/1999 | Hart et al. | 492/48 |
| 6,199,281 | B1 | | 3/2001 | Lee et al. | |
| 6,363,753 | B1 | | 4/2002 | Yoshizawa et al. | |
| 6,896,646 | B2 | * | 5/2005 | Kaiser et al. | 492/40 |
| 7,284,328 | B2 | * | 10/2007 | Kaiser | 29/895.21 |
| 7,507,194 | B2 | * | 3/2009 | Neubauer et al. | 492/40 |
| 7,624,646 | B2 | * | 12/2009 | Neubauer | 73/825 |
| 2004/0192526 | A1 | * | 9/2004 | Nakayama et al. | 492/40 |
| 2004/0220032 | A1 | * | 11/2004 | Nakayama et al. | 492/40 |
| 2008/0202253 | A1 | | 8/2008 | Neubauer | |
| 2009/0149310 | A1 | * | 6/2009 | Neubauer et al. | 501/95.2 |
| 2009/0272151 | A1 | * | 11/2009 | Lacasse et al. | 65/374.13 |
| 2011/0287915 | A1 | * | 11/2011 | Horiuchi et al. | 492/40 |
| 2011/0287916 | A1 | * | 11/2011 | Watanabe et al. | 492/40 |
| 2012/0004084 | A1 | * | 1/2012 | Neubauer | 492/40 |

FOREIGN PATENT DOCUMENTS

| | | | | |
|---|---|---|---|---|
| GB | 1 382 443 | | | 1/1975 |
| GB | 1382443 | A | | 1/1975 |
| JP | 58-156717 | | | 9/1983 |
| JP | 64-065037 | | | 3/1989 |
| JP | 64-083531 | | | 3/1989 |
| JP | 05-099574 | | | 4/1993 |
| JP | 05-124826 | | | 5/1993 |
| JP | 06-279834 | | | 10/1994 |
| JP | 06-348188 | | | 12/1994 |
| JP | 07-109514 | | | 4/1995 |
| JP | 2000-169170 | | | 6/2000 |
| JP | 2000-304452 | | | 11/2000 |
| JP | 2009132619 | A | * | 6/2009 |
| JP | 2010-155777 | | | 7/2010 |
| JP | 2010-155777 | A | | 7/2010 |
| WO | WO 03082755 | A1 | * | 10/2003 |

OTHER PUBLICATIONS

Professional English translation of Akase "Non Asbestos Disk Roll for Stainless Steel". Nichias 1993.
Professional English translation of DE19504044.
English translation (by computer) of JP05-099574.
English translation (by computer) of JP 05-124826.
Professional English translation of JP 06-279834.
English translation (by computer) of JP 06-348188.
Professional English translation of JP 2000-304452.
U.S. Appl. No. 61/141,442, filed Dec. 30, 2008.
Professional translation of selected paragraphs of JP05-099574.
Professional translation of selected paragraphs of JP 05-124826.
Professional translation of selected paragraphs of JP 06-348188.
Professional translation of JP58-156717.
Professional English translation of selected portions of Akase "Non Asbestos Disk Roll for Stainless Steel" Nichias 1993 submitted by 3rd Party Requester in ExParte proceeding.
English translations (computer and professional for selected portions) of JP05-099574 submitted by 3rd Party Requester in Ex Parte proceeding.
English translations (computer and professional for selected portions) of JP2000-304452 submitted by 3rd Party Requester in Ex Parte proceeding.
Professional English translation of JP64-083531.
English translation (by computer) of JP7-109514 (Foreign Document #1 above).
Jan. 27, 2012 Office Action regarding Reexamination Control No. 90/009,938, with attached Aug. 11, 2011 "Request for Ex Parte Reexamination".
U.S. Appl. No. 61/141,442 entitled "Method for Producing Pulling Rolls for Use in Manufacturing Sheet Glass" filed Dec. 30, 2008.
ASTM D-2240-97e1 "Standard Test Method for Rubber Property—Durometer Hardness," ASTM International, West Conshohocken PA, 1999, pp. 1-4.
English translation of DE 195 04 044 A (Reference 9 above).

* cited by examiner

METHOD FOR PRODUCING PULLING RODS FOR USE IN MANUFACTURING SHEET GLASS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to the manufacture of sheet glass. More particularly, the invention relates to improved pulling rolls for use in controlling the thickness of glass produced by, for example, the overflow downdraw fusion process. The invention is of particular value in the production of high quality sheet glass, which exhibits low levels of surface defects. Such glass can be used as substrates for flat panel displays, e.g., liquid crystal displays.

BACKGROUND OF THE INVENTION

Pulling rolls are used in the manufacture of sheet glass to apply tension to the ribbon of glass from which the sheets are formed and thus control the nominal sheet thickness. For example, in the overflow downdraw fusion process (see Dockerty, U.S. Pat. Nos. 3,338,696 and 3,682,609), pulling rolls are placed downstream of the tip or root of the fusion pipe and are used to adjust the rate at which the formed ribbon of glass leaves the pipe and thus determine the nominal thickness of the finished sheet.

Pulling rolls are preferably designed to contact the glass ribbon at its outer edges, specifically, in regions just inboard of the thickened beads which exist at the very edges of the ribbon. A preferred construction for such rolls employs discs of a heat resistant material, which are mounted on a driven shaft. Examples of this construction can be found in Moore, U.S. Pat. No. 3,334,010, Asaumi et al., U.S. Pat. No. 4,533,581, and Hart et al., U.S. Pat. No. 5,989,170.

A successful pulling roll needs to meet a number of conflicting criteria. First, the roll needs to be able to withstand the high temperatures associated with newly formed glass for substantial periods of time. The longer a roll can last in such an environment the better, since roll replacement reduces the amount of finished glass a given machine can produce and thus increases the ultimate cost of the glass.

Second, the roll must be able to produce enough pulling force to control the glass' thickness. In order not to damage the central portion of the ribbon that becomes the usable finished glass, the roll can only contact the ribbon over a limited area at its edges. Thus, the required pulling forces must be generated using only this area. However, the forces applied to the glass cannot be too large since this can create surface damage which can propagate into the usable central portion of the ribbon. Accordingly, the roll must achieve a balance between applying too little and too much force to the edge regions of the glass.

Third, the pulling roll must not give off excessive amounts of particles which can adhere to the glass and form surface defects (known as "onclusions"). For glass that is to be used in such demanding applications as substrates for flat panel displays, onclusions must be kept to very low levels since each onclusion will typically represent a defective region of the finished product (e.g., one or more defective pixels).

Because of the hot environment in which pulling rolls operate, finding materials which can apply sufficient pulling forces to a glass ribbon and yet not give off particles when hot is a difficult challenge.

The existing pulling rolls have not been able to fully satisfy these competing criteria of long life, controlled force application, and low contamination. The present invention addresses these shortcomings in the art and provides improved pulling rolls which achieve higher levels of performance than existing pulling rolls.

SUMMARY OF THE INVENTION

In accordance with a first aspect, the invention provides a roll (13) for pulling a glass ribbon (11) comprising:

(a) a shaft (17);

(b) a plurality of heat-resistant discs (15) mounted on the shaft in face-to-face contact, said discs having circular outer peripheries which together form a roll surface (33), one or more portions (27) of which are adapted to contact the glass ribbon during use of the roll, said discs comprising refractory ceramic fibers (e.g., glass fibers), mica, and a heat resistant binder (e.g., clay); and (c) a pair of fittings (e.g., outer collars (25) or the combination of an outer collar (25) and an inner collar (31)) affixed to the shaft, said fittings being spaced from one another along the shaft by a distance which causes an axial compressive force to be applied to the discs;

wherein when the discs are subject to said axial compressive force, the one or more portions of the roll surface that are adapted to contact the glass ribbon have a Shore D hardness at room temperature (e.g., 23° C.) of between 30 and 55.

In accordance with a second aspect, the invention provides a method for producing a pulling roll of the above type, said method comprising:

(a) providing a shaft (17), two fittings (e.g., outer collars 25 or the combination of an outer collar 25 and an inner collar 31), and a plurality of heat-resistant discs (15), said discs comprising refractory ceramic fibers, mica, and a heat resistant binder;

(b) assembling the plurality of heat-resistant discs on the shaft and compressing the discs between the fittings; and (c) monitoring the amount of force used in step (b) to compress the discs and adjusting the number of discs if said force is outside a predetermined range;

wherein the predetermined range in step (c) is selected so that one or more portions (27) of the roll's surface (33) that contact the glass ribbon (11) during use of the roll have a Shore D hardness at room temperature of between 30 and 55. In practice, the number of discs ultimately assembled on the shaft and locked in place by the fittings will typically be in the 200-400 range depending on the size of the glass ribbon being produced, although more or less discs can be used in the practice of the invention if desired. For example, less discs will typically be used in the embodiment of FIG. 6.

In accordance with each of the above aspects, the heat-resistant discs are preferably pre-fired prior to assembly to form the pulling roll so that they exhibit substantially no compositional changes when exposed to the temperatures at which the roll pulls the glass ribbon and thus will be dimensionally stable under operating conditions. Also, prior to the pre-firing, the heat-resistant discs in addition to comprising refractory ceramic fibers, mica, and a heat resistant binder, preferably also comprise cellulose fibers, which are burned off during the pre-firing.

If desired, instead of employing pre-firing, any non-heat resistant materials which the discs contain (e.g., the cellulose fibers) can be removed in situ as the roll is put into service. In such a case, the pressure used to assemble the roll should be adjusted (increased) to take account of the material that will burn off from the roll when exposed to the hot environment surrounding the newly-formed glass ribbon. In particular, the pressure should be increased so that after the in situ burnout, the one or more glass-engaging portions of the roll surface will have the required Shore D hardness at room temperature of between 30 and 55.

In practice, the pulling rolls of the invention have been found to achieve a long service life without applying excessive force to the glass ribbon or generating high levels of particulate contamination. In practice, the service life of a roll can often be prematurely shortened by outside events that damage the roll (e.g., a fracture of the glass ribbon). However, in the absence of such events, the pulling rolls of the invention easily achieve long service lives, e.g., service lives in excess of 40 days, preferably in excess of 75 days, and most preferably in excess of 100 days.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as claimed.

The accompanying drawings are included to provide a further understanding of the invention, and are incorporated in and constitute a part of this specification. The drawings illustrate various embodiments of the invention, and together with the description serve to explain the principles and operation of the invention.

Figure 1:
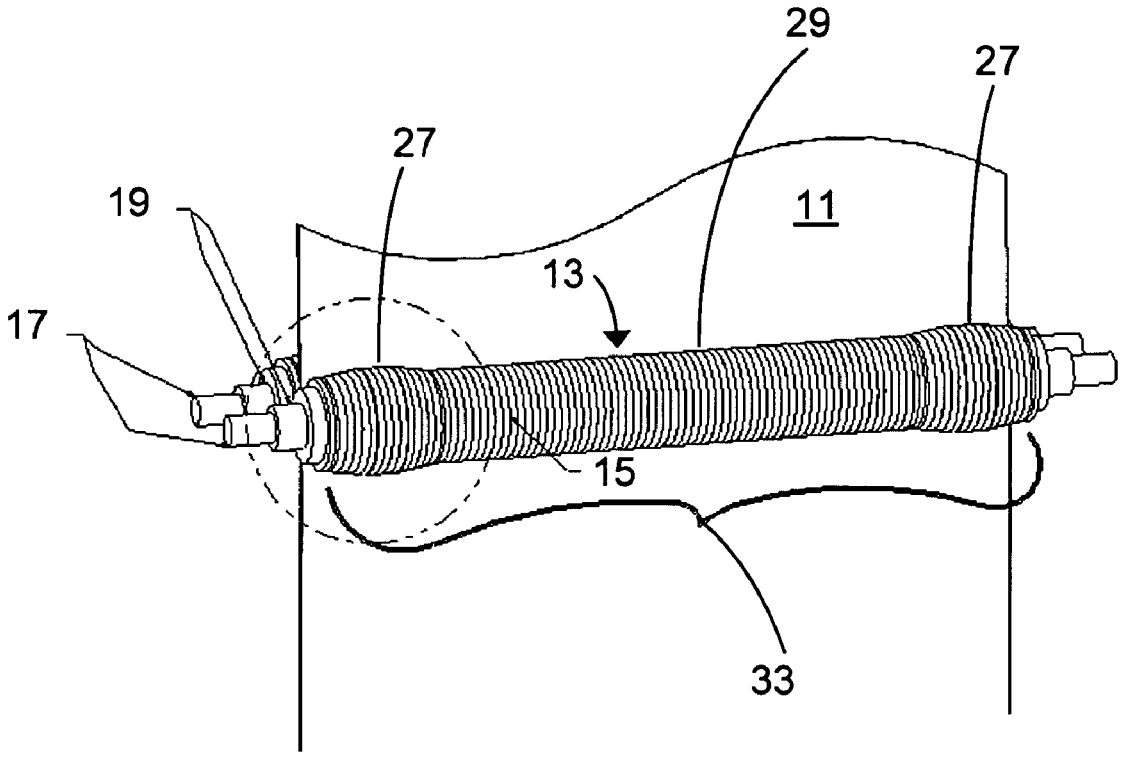
FIG. 1 is a perspective view showing the use of pulling rolls constructed in accordance with the invention to pull a ribbon of newly formed glass.

The reference numbers used in the drawings correspond to the following:

11 glass ribbon
13 pulling roll
15 disc
17 shaft
19 bearing surface
21 retaining ring
23 groove
25 outer collar
27 glass-engaging portions of roll surface
29 non-glass-engaging portions of roll surface
31 inner collar
33 roll surface

DETAILED DESCRIPTION OF THE INVENTION

Figure 2:
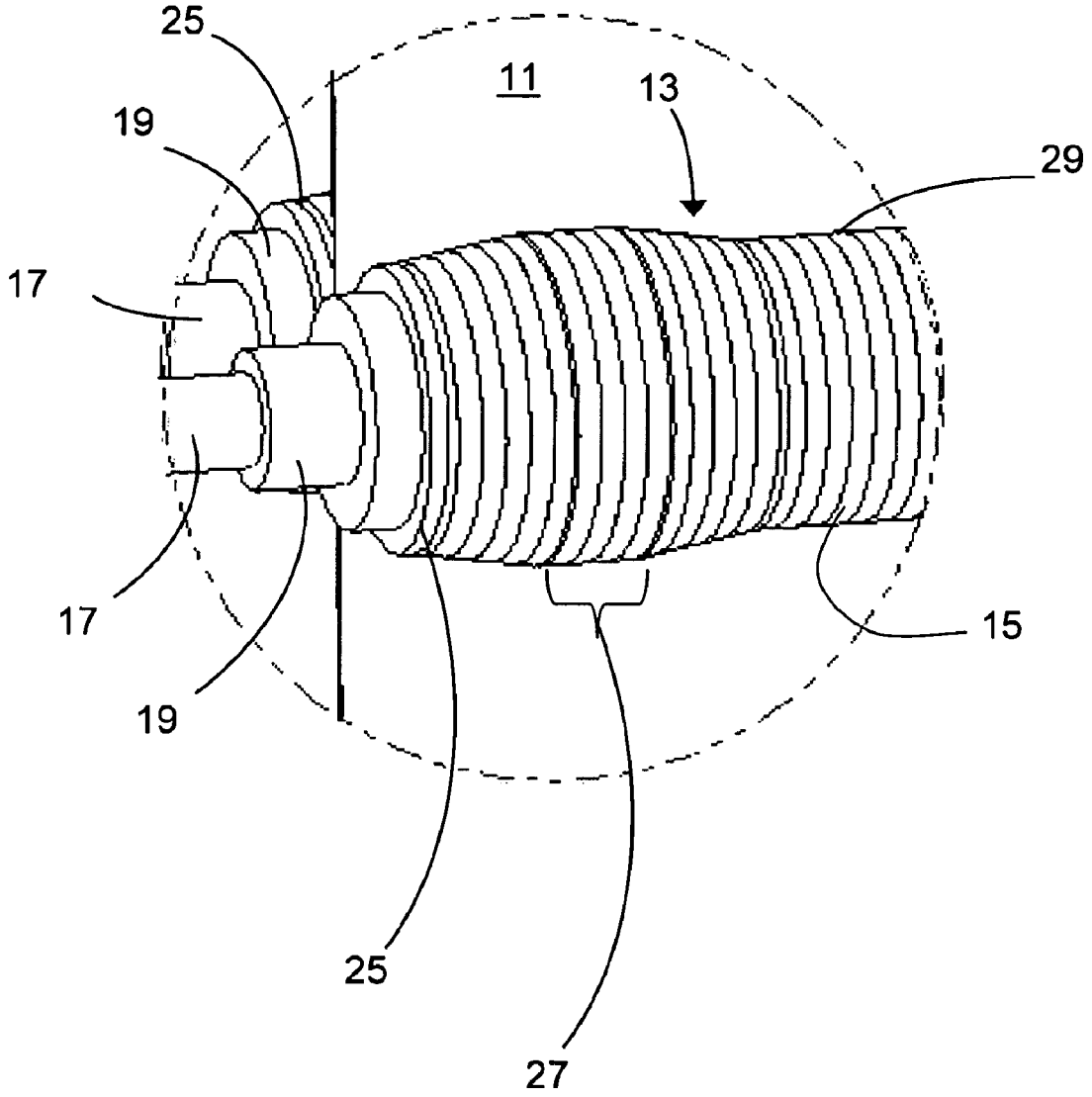
FIG. 2 is an expanded view of the left hand portion of FIG. 1.
Figure 3:
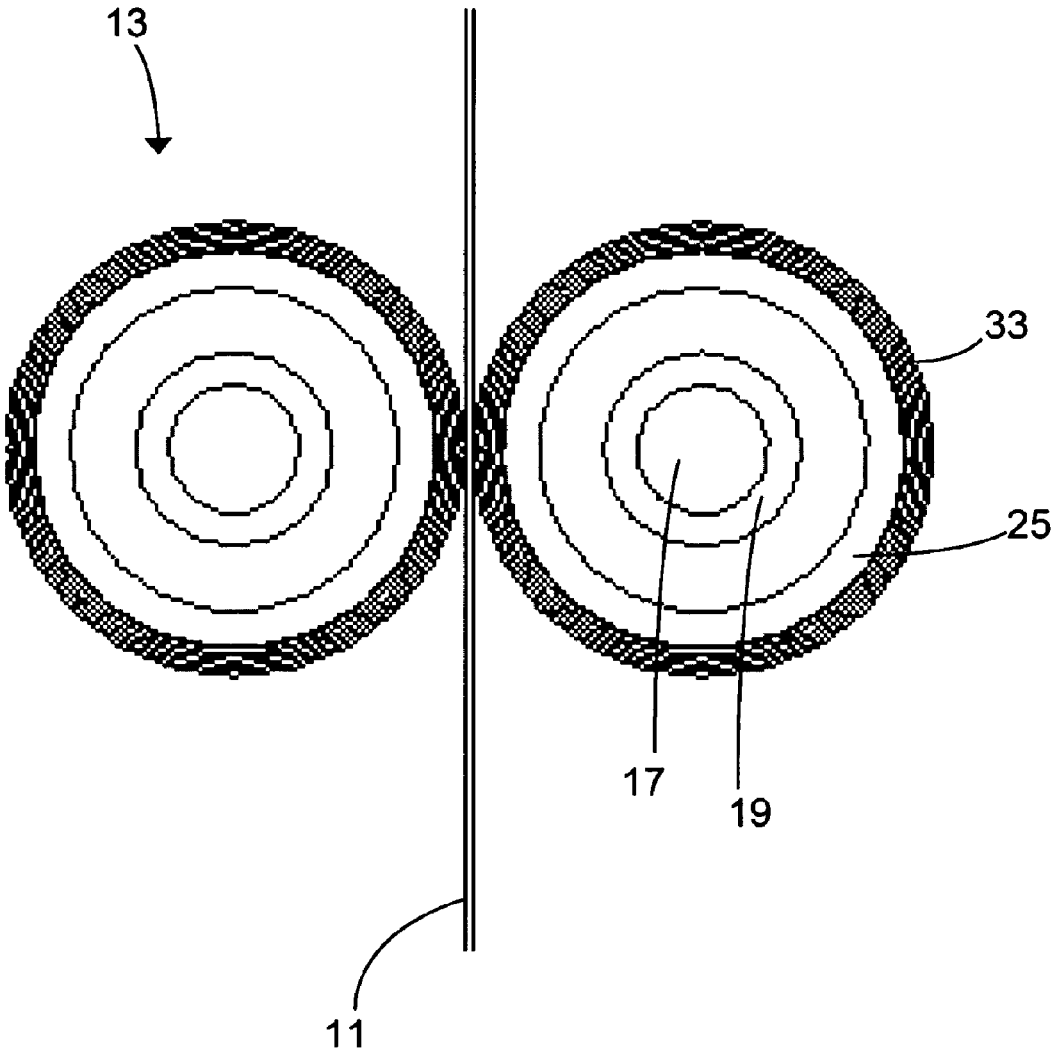
FIG. 3 is an end view of the pulling rolls and glass ribbon of FIG. 1.

With reference now to the drawings, wherein like reference characters designate like or corresponding parts throughout the several views, there is shown in FIG. 1 a perspective view of a pair of pulling rolls 13 engaging a glass ribbon 11, e.g., a newly-formed ribbon of LCD glass formed by an overflow downdraw process. FIGS. 2 and 3 show the engagement of the pulling rolls with the glass ribbon in more detail.

Figure 4:
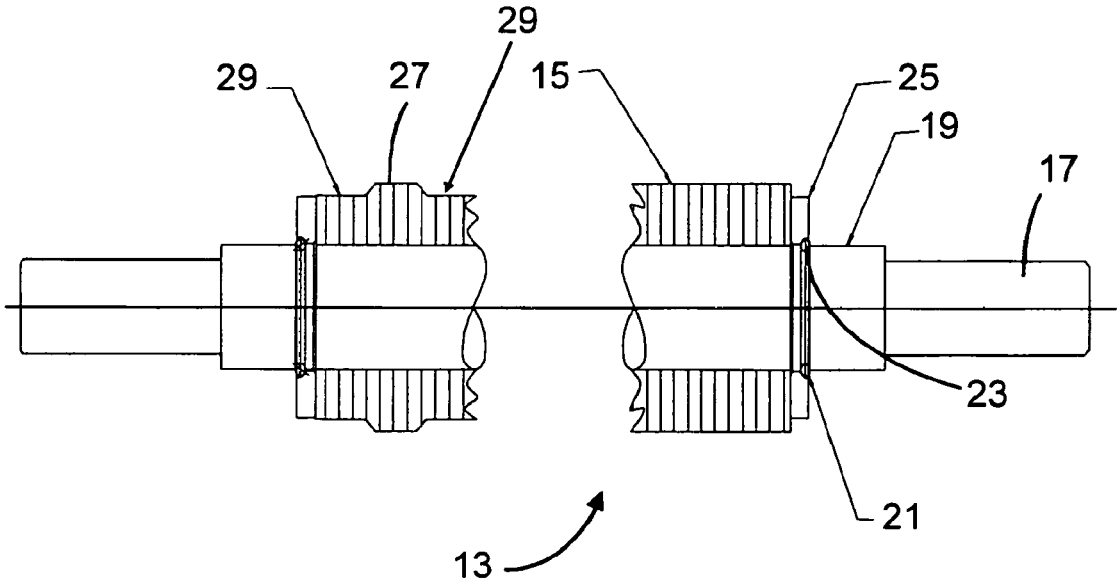
FIG. 4 is a front cross-sectional view of a pulling roll constructed in accordance with the invention.

As can be seen most clearly in FIG. 4, each pulling roll 13 includes a shaft 17 which carries a plurality of discs 15 which are held in place by collars 25. Collars 25 are preferably locked in place on shaft 17 by split retaining rings (snap rings) 21 which seat in grooves 23 formed in the shaft. Although retaining rings are preferred, other mechanisms known in the art for attaching a collar to a shaft can be used if desired. Also, although collars are preferred, any type of fitting which can apply an axial compressive force to the heat-resistant discs when affixed to the shaft can be used in the practice of the invention. It should be noted that for each pair of fittings, only one of the fittings has to be removable to allow discs 15 to be assembled onto shaft 17. The other fitting can be permanently attached to the shaft or can be integrally formed as part of the shaft. The word "affixed" as used herein is intended to cover these various alternatives.

As shown in FIGS. 1-3, the fully assembled pulling rolls can include bearing surfaces 19 at the ends of shaft 17. Although various materials can be used for the shaft and bearing surfaces, preferred materials include a cast stainless steel alloy for the shaft, e.g., a centrifugal cast HP 45 alloy, in combination with stainless steel bearing surfaces, e.g., 330 stainless steel.

As illustrated by the right and left hand portions of FIG. 4, discs 15 when first mounted on shaft 17 preferably all have, or are cut to have, the same diameter (see the right hand portion of FIG. 4) with an overall contour subsequently being cut in the discs to leave raised areas (flats) 27 and recessed areas 29 (see the left hand portion of FIG. 4). As shown in, for example, FIG. 1, only raised areas 27 contact glass ribbon 11 during use of the pulling roll. Although the pulling rolls shown in the figures have only two raised areas (two glass engaging portions), additional areas can be used if desired, e.g., four areas can be used, with two areas being grouped at one end of the roll and the other two being grouped at the other end. Indeed, although not preferred, the invention can be practiced with a roll having only one glass-engaging portion.

Figure 5:
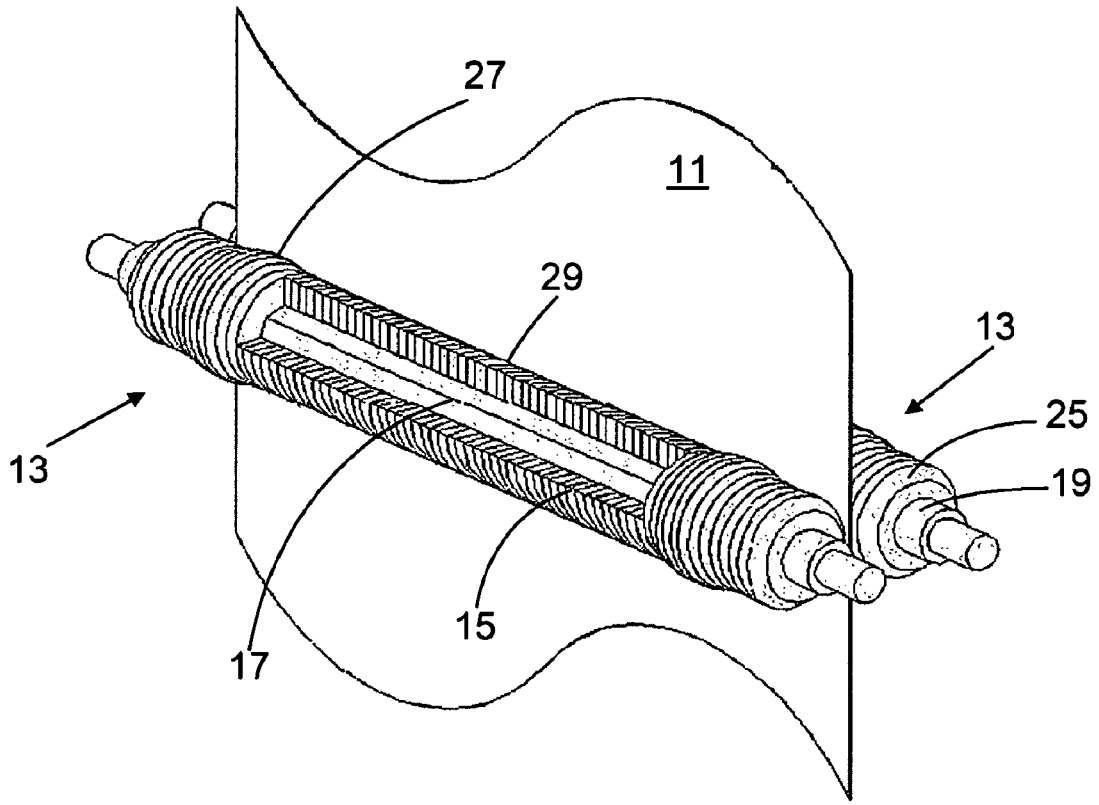
FIG. 5 is a perspective view, partially in section, of a pulling roll constructed in accordance with the invention and having a hexagonal shaft.

FIG. 5 shows an alternate construction for pulling roll 13 where shaft 17 has a non-circular cross section, specifically, a hexagonal cross-section in this figure. Such a non-circular cross-section can be used if excessive amounts of rotation of discs 15 about shaft 17 should be observed in a particular application of the pulling roll of the invention. In such a case, disc 15 will include a central aperture whose shape corresponds to that of the non-circular shaft, i.e., the central aperture instead of being round will have the same non-circular shape as the shaft. A non-circular cross section can be formed in the shaft by starting with a circular shaft and then machining the shaft to the desired configuration, e.g., by machining a shaft composed of carbon steel. Cast or drawn shafts can also be used in this embodiment of the invention. For most applications, rotation of discs 15 about shaft 17 does not occur to any substantial degree and thus shafts having a circular cross-section can be used and are preferred.

Figure 6:
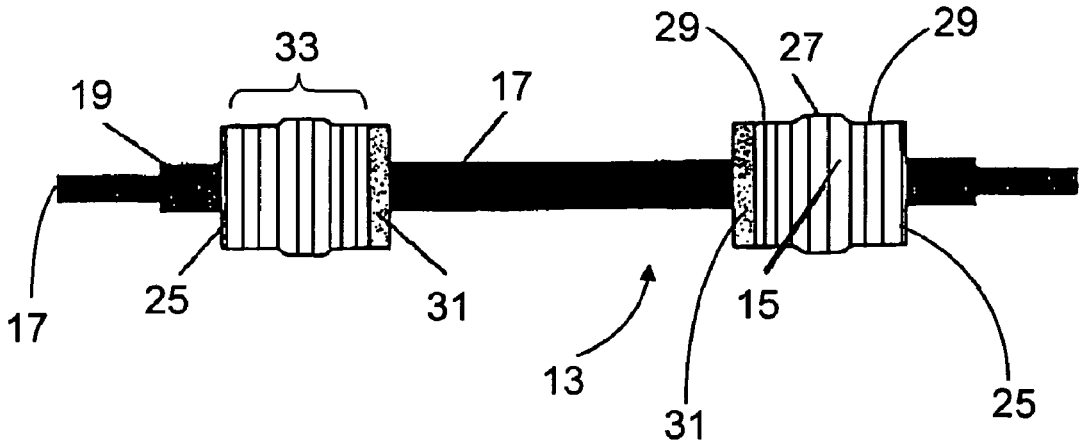
FIG. 6 is a front view of a pulling roll constructed in accordance with the invention and having semi-compliant discs only in the vicinity of the places where the pulling roll makes contact with the glass ribbon.

FIG. 6 shows a further alternate pulling roll configuration which can be used in the practice of the invention. As a general rule, reducing the outer diameter of the discs located in central recessed area 29 is advantageous because in addition to avoiding contact with the glass, such a reduction minimizes at least to some extent the amount of material at the center of the roll which can become airborne and adhere to the glass ribbon to form defects. However, since the packing pressure on the discs in the glass-engaging portions of the rolls' surface decreases as the outside diameter of the center section is reduced, even though overall there is less material (less surface area), more of the material that is left has the potential to form contaminating particles.

Also, as a consequence of the reduction in packing pressure, the flat location becomes more prone to lose integrity and thus reduce the life of the roll. Typically, as the roll loses integrity, the flat location is compacted and the discs at this location lose elasticity, which manifests itself through pronounced slippage of the glass ribbon. In other cases, the integrity of the roll is so degraded that the flats deform enough to warp the glass ribbon so that the finished sheet does not conform to production specifications.

The embodiment of the invention shown in FIG. 6 addresses these problems. As shown in this figure, discs are completely removed from the center of the roll and are only used in the regions of the flats. With less discs, the chance that particles from the discs will become airborne and generate defects on the glass ribbon is reduced. Also, with less discs, the time required to cut a specific roll profile is reduced, since there is now less material that needs to be removed to create the desired pattern in the surface of the roll.

Because the surface of shaft 17 is completely exposed throughout the center section of the roll, a coating is preferably applied to the shaft to reduce the chances of oxidation of the metal making up the shaft, e.g., stainless steel. Suitable coatings include various ceramic coatings, such as CERAK M-720 Black Ceramic Coating distributed by Cetek Limited of Berea, Ohio.

To maintain the integrity of the discs, two inner collars 31 are affixed to shaft 17 using, for example, split retaining rings of the type discussed above in connection with outer collars 25. These inner collars enhance the packing pressure near the flats and therefore improve roll life.

An additional benefit of this embodiment of the invention is that it allows a higher level of cooling of the glass at the location of the pulling rolls. Such additional cooling is of value since glass temperatures at this location, which can be as high as 800° C., dictate the amount of warp and stress the glass ribbon experiences and thus the finished sheet will exhibit.

The embodiment of FIG. 6 can be used with a circular or non-circular shaft and can employ bearing surfaces 19.

Whatever configuration is used for the pulling rolls (i.e., the configurations shown in FIGS. 1-6 or other configurations now known or subsequently developed), the ultimate success of a roll depends on the properties of discs 15. In accordance with the preferred embodiments of the invention, discs of a specific composition which have been pre-fired and assembled in a particular manner are used to form the pulling rolls of the invention. Such discs have been found to meet the service life, controlled force application, and low contamination criteria discussed above.

In general terms, the discs need to be substantially non-friable when subjected to the forces and operating temperatures involved in pulling a newly-formed glass ribbon. In accordance with the invention, it has been found that discs comprising refractory ceramic fibers, mica, and a heat resistant binder have this property. In general terms, after any non-heat resistant components have been burned off, the discs preferably comprise by weight: 10-20% refractory ceramic fibers, 40-50% mica, and 40-50% heat resistant binder.

More particularly, the discs are most preferably: (1) a composite of clay, mica, glass fibers, and cellulose fibers; and (2) pre-fired so that they exhibit substantially no compositional changes when exposed to the temperatures associated with a pulling roll during use and will thus be dimensionally stable under operating conditions. For example, the pre-firing can comprise heating the discs to a temperature of 700-800° C., preferably 760-800° C. (e.g., to 760° C.), holding them at that temperature for a period of at least two hours, and then cooling them back to room temperature before assembly onto the pulling roll's shaft.

Pre-firing to such temperatures ensures that the disc material experiences all phase changes prior to use and thereby reduces variability of the material after it has entered into service. Other pre-firing times and temperatures can, of course, be used in the practice of the invention so long as they provide a finished pulling roll whose composition is stable at the rolls' operating temperature.

A composite having the above composition is commercially available from Nichias Corporation of Tokyo, Japan, under the product designation SD-115. This product is supplied in sheets having a thickness of about 6 millimeters and can be cut into discs having a circular outer perimeter (e.g., a diameter of 140 mm) and a center aperture (e.g., a circular aperture having a diameter of 64 mm) using, for example, a water jet cutter or an appropriately sized punch, punching being preferred.

Alternatively, sheets of the composite can be prepared by, for example: (1) forming a water slurry of clay (e.g., GLOMAX LL), mica, glass fibers (e.g., 10 wt. % $Al_2O_3$—$SiO_2$ fibers), wood fiber (e.g., HIBRITE from Canada), and starch; (2) forming layers from the slurry using a rotary drum "paper making" machine; (3) stacking the layers (e.g., 20 layers) to make a millboard 6 mm thick; (4) draping the millboard over a drying rack to air dry for at least 24 hours; and (5) placing the drying rack in an oven at 110° C. for 24 hours.

Other commercially available composites besides the SD-115 material and other methods for producing such composites can, of course, be used in the practice of the invention.

Even more important than disc composition and pre-firing, the assembly of the discs onto the shaft of the pulling roll is critical to the success of the invention. In particular, it has been found that the compression force (pressing force) used in assembling the discs to form the pulling roll must be carefully controlled to achieve a long service life. For example, as discussed in more detail below, it was found that a compression force of approximately 33,000 pounds resulted in a pulling roll having only a limited life (i.e., 39 days), while a compression force of 11,000 to 14,000 pounds resulted in a roll having a much longer life (i.e., greater than 100 days). For discs having an outside diameter of about 5 inches (127 millimeters) and an inside diameter of about 2.5 inches (63.5 millimeters), these forces correspond to axial pressures of approximately 2,250 psi for the high compressive force and approximately 750-950 psi for the low compressive force.

Since compression force may vary with such factors as the composition and number of discs used, a better measure of the amount of compression which should be applied to the discs is the Shore hardness (specifically, the Shore D hardness) of the outer surface of the assembled roll and, in particular, the portions of the outer surface that will come into contact with the glass ribbon during use of the roll. In accordance with the invention, it has been found that the Shore D hardness of these glass-engaging portions of the outer surface of the pulling roll must be in the range of 30 to 55 and preferably in the range from 40 to 55 to achieve a long service life. A Shore D hardness in these ranges allows the surface of the pulling roll to comply with the glass surface thereby reducing surface damage that results in checking. The Shore D hardness is measured using commercially available equipment.

Without intending to limit it in any manner, the present invention will be more fully described by the following comparative examples.

COMPARATIVE EXAMPLE 1

This example compares various materials used to form the discs of a pulling roll, as well as the compression force used to assemble the discs on the pulling roll shaft. The following materials were tested: (1) ZYALITE—a mixture of aluminosilicate fibers and amorphous silica (colloid) sold by Vesuvius McDanel of Beaver Falls, Pa.; (2) ZYAROCK—a porous fused silica also sold by Vesuvius McDanel; (3) Nichias SD-115 compressed at approximately 33,000 pounds (approximately 2,250 psi) (Dense Nichias); and (4) Nichias SD-115 compressed at 11,000 to 14,000 pounds (approximately 750-950 psi) (Less Dense Nichias).

The results were as follows:

(1) ZYALITE—Rolls made from this material wore noticeably, with the wear particles contaminating the virgin glass surface, i.e., the material was friable and formed onclusions. It is believed that these problems result from low surface hardness in combination with anisotropy due to a fibered microstructure.

(2) ZYAROCK—Rolls of this material caused a great deal of frictive damage. This problem is believed to be due to the combination of the high penetration hardness and the high elastic modulus of the material.

(3) Dense Nichias—This material performed well compared to the above materials except roll life was short. The high density of the roll seems to encourage damage to the glass ribbon by collecting glass on the roll surface. Relatively high penetration hardness did not allow adhered glass to "sink" into the surface of the roll.

(4) Less Dense Nichias—This material performed well compared to all of the above. It delivered long service life without onclusions or significant wear of the material. Although not wishing to be bound by any particular theory of operation, it is believed that this superior performance was due to the material having a low elastic modulus and low penetration hardness. The material was able to conform to the glass without generating excessive stress and glass particles on the roll surface were able to become "embedded" in the material without causing excessive damage.

COMPARATIVE EXAMPLE 2

This example illustrates the importance of controlling the compression force applied to the discs in the assembly of the pulling roll. Five rolls made from the Nichias SD-115 material were tested. The rolls had the following properties and service lives where the reference in this table to compression of the discs with high pressure means a pressing force of approximately 33,000 pounds (approximately 2,250 psi) and compression with low pressure means a pressing force of 11,000 to 14,000 pounds (approximately 750-950 psi):

| Roll Number | Characteristics | Service Life |
|---|---|---|
| 1 | Discs fired to 640° C.; hex shaft of carbon steel; discs compressed on shaft with high pressure. | 3 days |
| 2 | Discs fired to 640° C.; circular shaft of cast HP 45 alloy; discs compressed on shaft with high pressure. | 22 days |
| 3 | Discs fired to 760° C.; circular shaft of cast HP 45 alloy; discs compressed on shaft with high pressure. | 39 days |
| 4 | Unfired discs; hex shaft of carbon steel; discs compressed on shaft with high pressure. | 77 days |
| 5 | Discs fired to 760° C.; circular shaft of cast HP 45 alloy; discs compressed on shaft with low pressure. | >100 days |

The data in this table assumes that the life of the roll was not prematurely shortened by extraneous process damage. The enhanced service life of roll 5 is evident from this table thus illustrating the importance of the pressing force used during assembly to the ultimate usefulness of the pulling roll.

Roll 4 is believed to have had a longer service life than rolls 1-3 because although this roll was pressed with high pressure, it was not pre-fired and as a result, it experienced in situ burnout. The in situ burnout and concomitant loss of non-heat resistant material produced a reduction in the effective pressing force. Accordingly, roll 4 behaved as if it had undergone pre-firing and had then been pressed with a low pressing force.

Rolls 2 and 3 are believed to have had longer service lives than roll 1 because these rolls used stainless steel, rather than carbon steel, shafts. The stainless steel shafts had higher CTE's than the carbon steel shaft and thus produced a greater reduction in the effective pressing force on the discs as the roll was heated to operating temperature. That is, in both cases, the shaft expanded more than the discs, but in the case of the stainless steel shafts, more expansion occurred and thus the discs were under less compression during use, which enhanced their service life.

Although specific embodiments of the invention have been described and illustrated, it will be apparent to those skilled in the art that modifications and variations can be made without departing from the invention's spirit and scope. The following claims are thus intended to cover the specific embodiments set forth herein as well as such modifications, variations, and equivalents.

What is claimed is:

[1. A method for producing a roll for pulling a glass ribbon comprising:

(a) providing a shaft, two fittings, and a plurality of heat-resistant discs, said discs comprising refractory ceramic fibers, mica, and a heat resistant binder;

(b) assembling the plurality of heat-resistant discs on the shaft and compressing the discs between the fittings; and (c) monitoring the amount of force used in step (b) to compress the discs and adjusting the number of discs if said force is outside a predetermined range;

wherein:

(i) the roll has a roll surface, one or more portions of which are adapted to contact the glass ribbon during use of the roll; and (ii) the predetermined range in step (c) is selected so that the one or more portions have a Shore D hardness at room temperature of between 30 and 55.]

[2. The method of claim 1 wherein prior to step (a), the heat-resistant discs are pre-fired so that they exhibit substantially no compositional changes when exposed to the temperatures at which the roll pulls the glass ribbon.]

[3. The method of claim 2 wherein the heat-resistant discs are pre-fired at a temperature of at least 700° C. for a period of at least two hours.]

[4. The method of claim 2 wherein the heat-resistant discs prior to pre-firing comprise cellulose fibers.]

[5. The method of claim 1 including the additional step of using the roll to pull a glass ribbon for at least 40 days.]

*6. A method of making glass sheets comprising:*

*(A) forming a glass ribbon;*

*(B) applying tension to the glass ribbon using a pair of pulling rolls; and*

*(C) forming glass sheets from the glass ribbon;*

*wherein*

*(I) each pulling roll comprises a shaft and a plurality of heat-resistant discs mounted on the shaft in face-to-face contact and compressed against one another, and*

*(II) each pulling roll has a roll surface which has one or more glass-engaging portions which contact the glass ribbon, wherein:*

*(a) the discs, and thus each of the one or more glass-engaging portions, comprise refractory ceramic fibers, mica, and a heat resistant binder, and*

*(b) at room temperature, each of the one or more glass-engaging portions has a Shore D hardness of between 30 and 55.*

*7. The method of claim 6 wherein each of the one or more glass-engaging portions has a Shore D hardness at room temperature of between 40 and 55.*

*8. The method of claim 6 wherein in the absence of externally caused damage, each pulling roll is used to perform step (B) for at least 40 days.*

*9. The method of claim 6 wherein in the absence of externally caused damage, each pulling roll is used to perform step (B) for at least 75 days.*

*10. The method of claim 6 wherein in the absence of externally caused damage, each pulling roll is used to perform step (B) for at least 100 days.*

*11. The method of claim 6 wherein before being mounted on the shaft, the discs are fired so that they exhibit substantially no compositional changes when the pulling rolls are used in step (B).*

*12. The method of claim 11 wherein the discs are fired at a temperature of at least 700° C. for a period of at least two hours.*

* * * * *